United States Patent
Young et al.

(10) Patent No.: US 10,322,816 B2
(45) Date of Patent: Jun. 18, 2019

(54) SLAT SKEW DETECTION SYSTEM AND METHOD

(71) Applicant: BOMBARDIER INC., Dorval (CA)

(72) Inventors: Robert Young, Montréal (CA); Waseem Wahba, Montréal (CA); Vlad Iliescu, Kirkland (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/018,445

(22) Filed: Jun. 26, 2018

(65) Prior Publication Data

US 2019/0002121 A1 Jan. 3, 2019

Related U.S. Application Data

(60) Provisional application No. 62/526,707, filed on Jun. 29, 2017.

(51) Int. Cl.
*B64D 45/00* (2006.01)
*B64C 9/22* (2006.01)

(52) U.S. Cl.
CPC .......... *B64D 45/0005* (2013.01); *B64C 9/22* (2013.01); *B64D 2045/001* (2013.01); *B64D 2045/0085* (2013.01)

(58) Field of Classification Search
CPC .......... B64D 45/0005; B64D 2045/001; B64D 2045/0085; B64C 9/22; B64C 13/04; B64C 9/16; B64C 13/503; H04L 12/403
See application file for complete search history.

(56) References Cited

U.S. PATENT DOCUMENTS

| | | | | |
|---|---|---|---|---|
| 5,680,124 | A * | 10/1997 | Bedell | B64D 45/0005 244/194 |
| 8,115,649 | B2 * | 2/2012 | Moy | B64D 45/0005 244/194 |
| 10,137,999 | B2 * | 11/2018 | Nelson | B64C 9/16 |
| 2008/0265090 | A1 * | 10/2008 | Schievelbusch | B64D 45/0005 244/99.3 |
| 2010/0277346 | A1 * | 11/2010 | Moy | B64D 45/0005 340/945 |
| 2016/0001894 | A1 * | 1/2016 | Jones | B64D 45/0005 701/3 |
| 2017/0233095 | A1 * | 8/2017 | Baines | B64C 9/02 244/99.3 |
| 2017/0355449 | A1 * | 12/2017 | Bapat | B64C 9/22 |
| 2018/0111697 | A1 * | 4/2018 | Jones | B64D 45/0005 |
| 2018/0281987 | A1 * | 10/2018 | Nelson | B64C 9/16 |

* cited by examiner

*Primary Examiner* — An T Nguyen
(74) *Attorney, Agent, or Firm* — Norton Rose Fulbright Canada LLP

(57) ABSTRACT

Methods and systems for detecting skew in a wing slat of an aircraft are provided. At least one pair of sensors associated with the wing slat is excited via at least one first electronic device. In response to the exciting and at the at least one first electronic device, at least one pair of signals indicative of at least one pair of state-change counts for the at least one pair of sensors is obtained. The at least one pair of state-change counts is transmitted to at least one second electronic device communicatively coupled to the at least one first electronic device. At the at least one second electronic device, a skew level of the wing slat is determined based on the at least one pair of state-change counts.

20 Claims, 8 Drawing Sheets

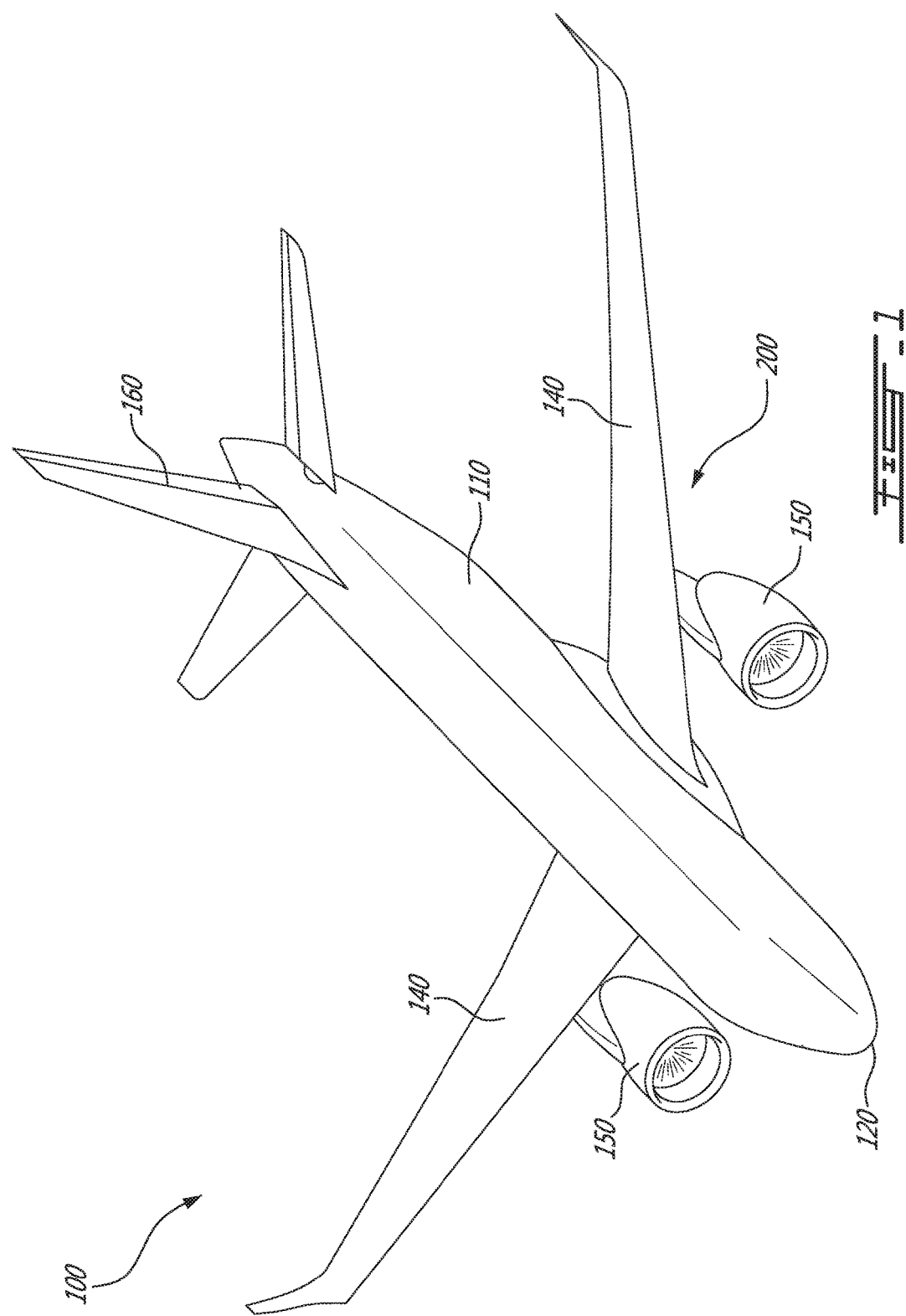

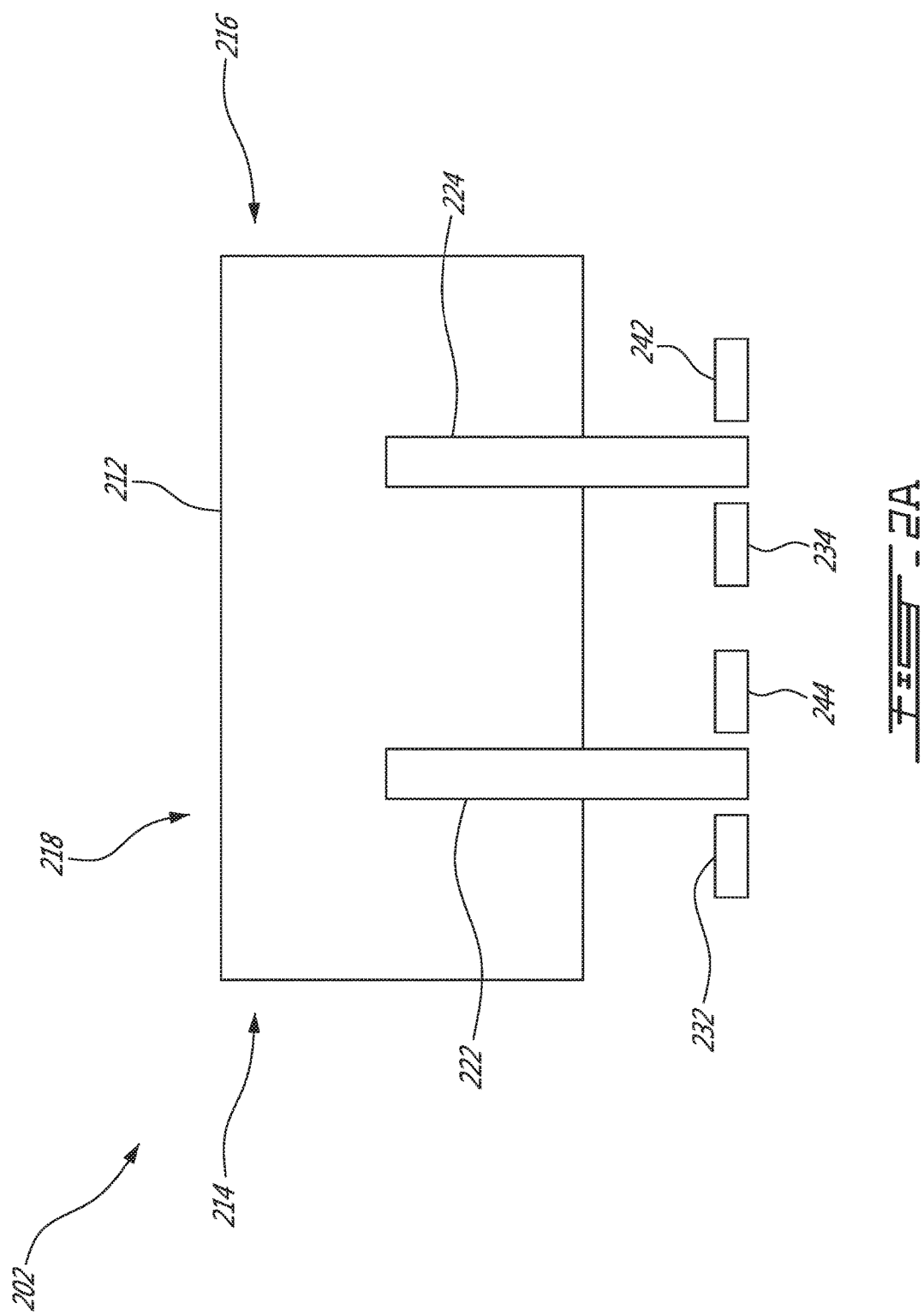

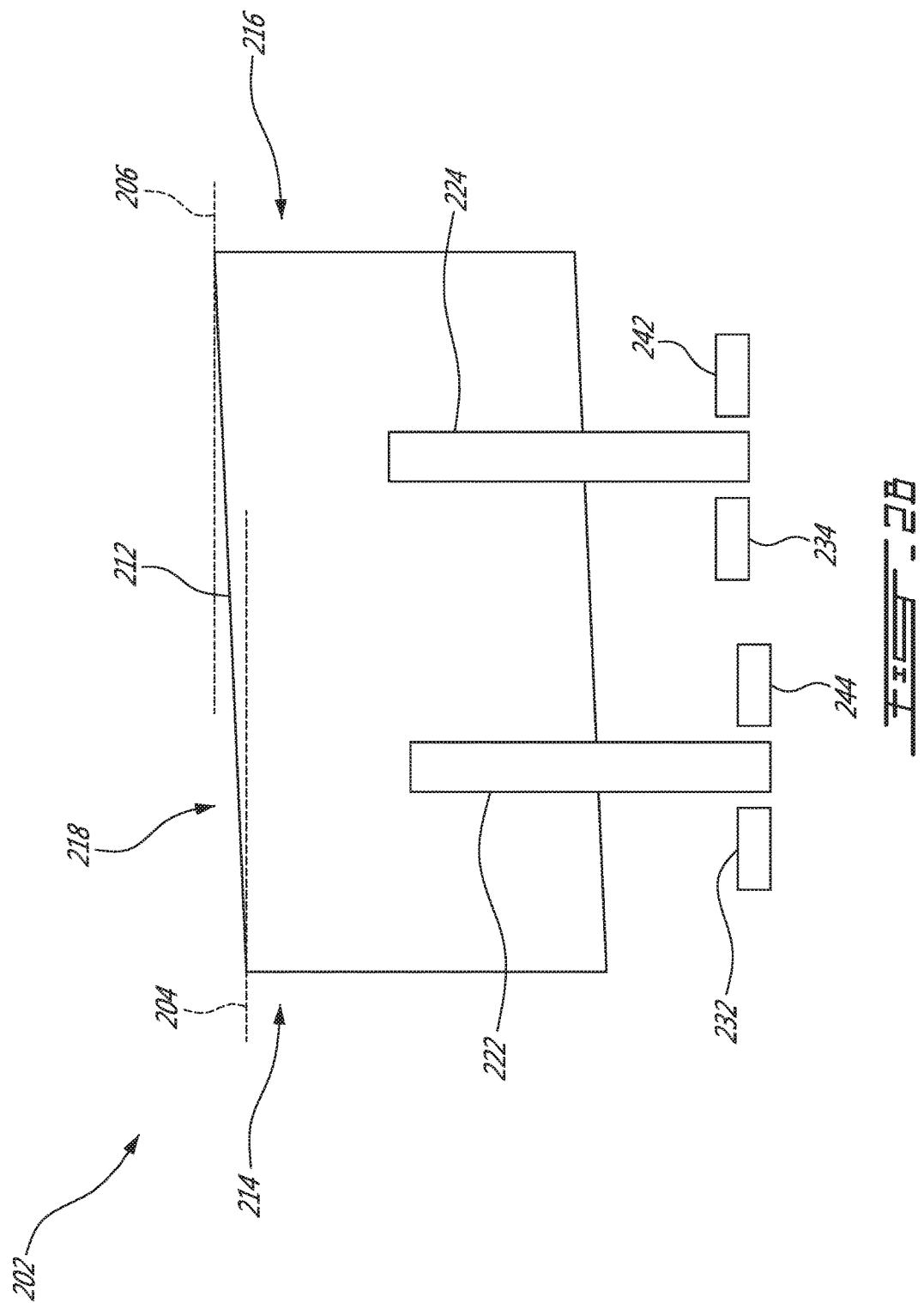

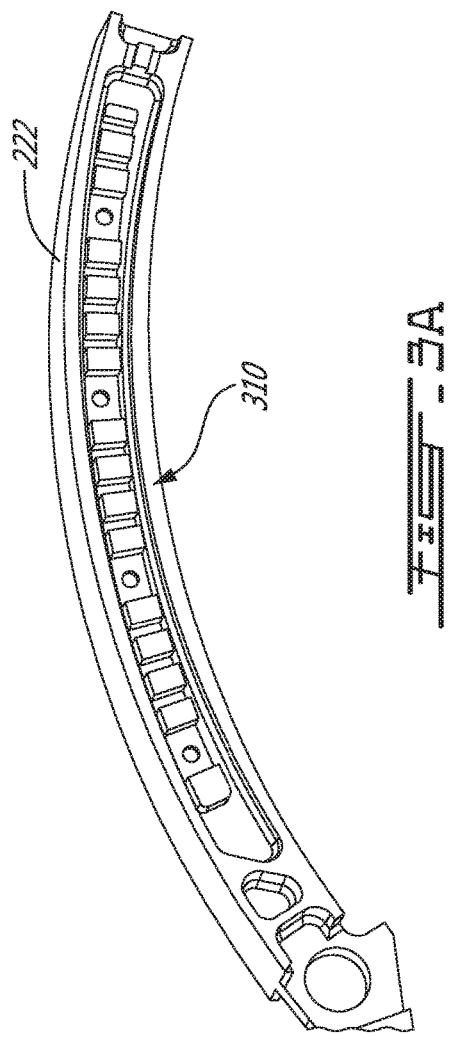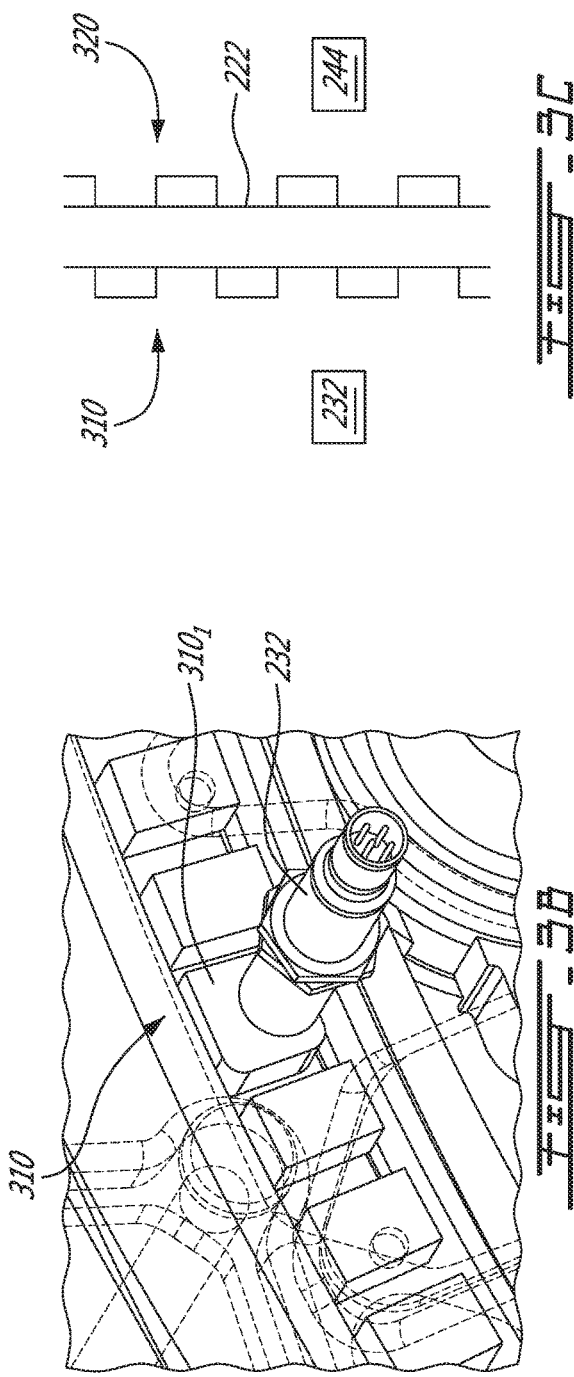

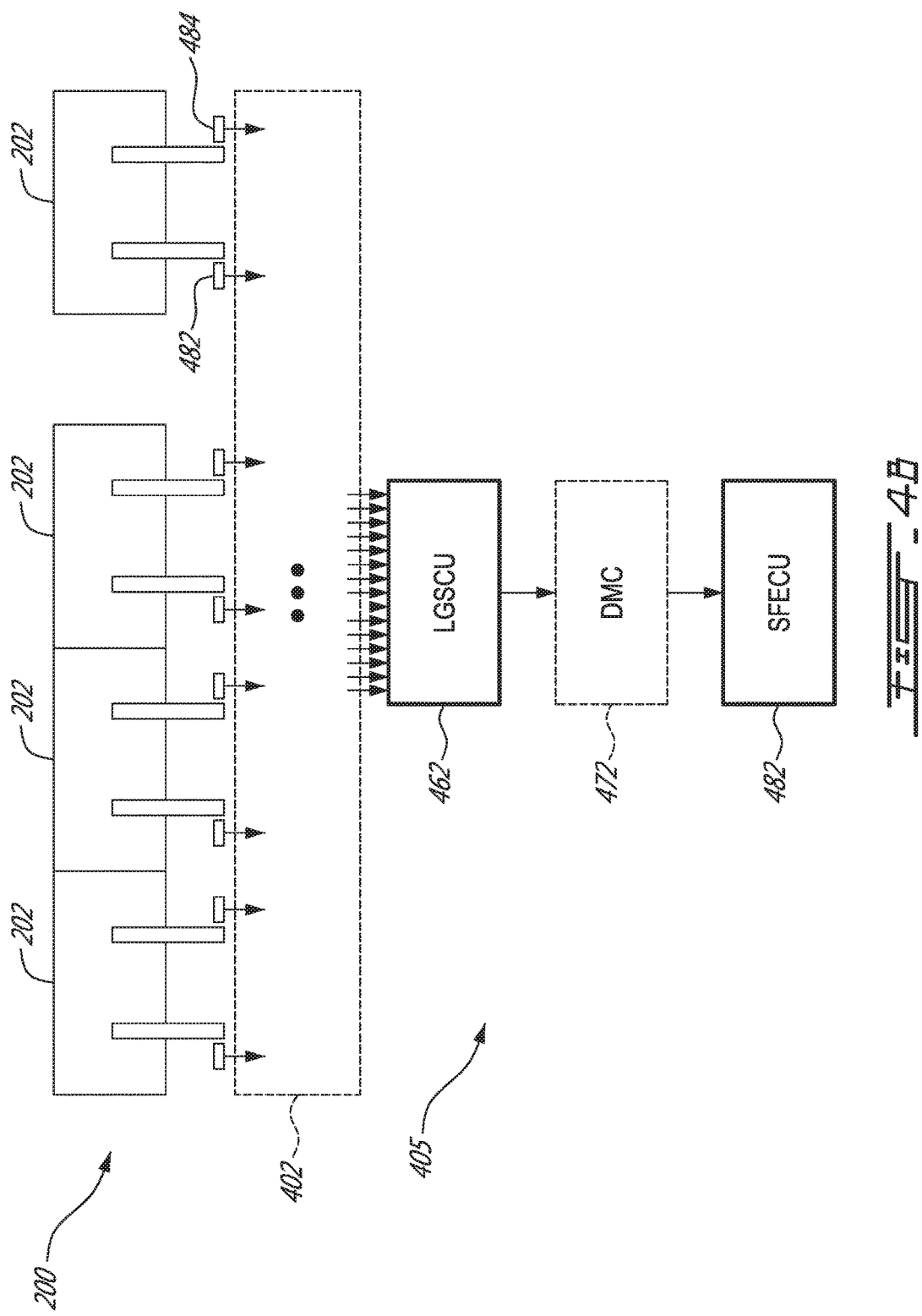

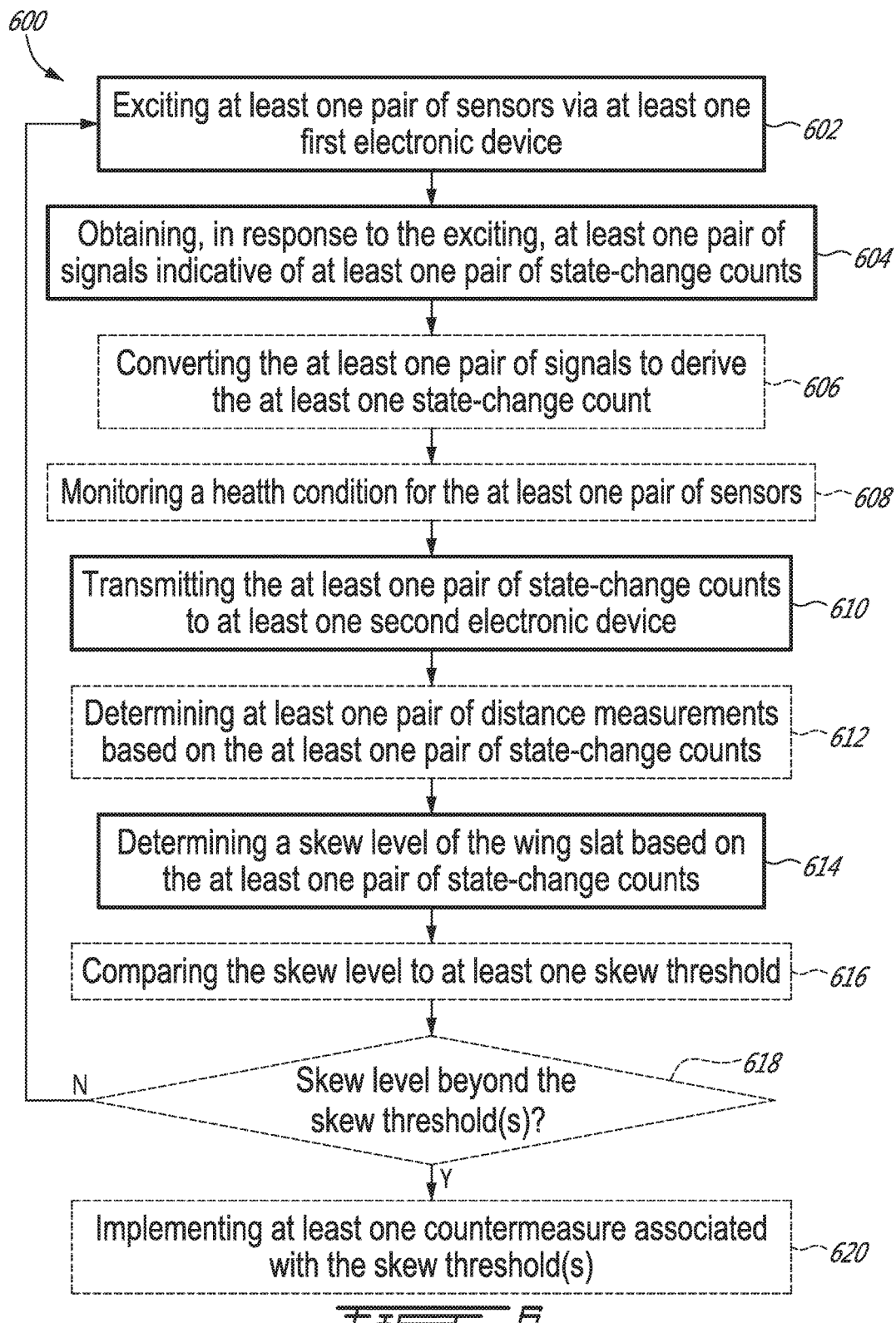

SLAT SKEW DETECTION SYSTEM AND METHOD

CROSS-REFERENCE TO RELATED APPLICATION(S)

This application relies for priority on U.S. Provisional Patent Application Ser. No. 62/526,707 filed on Jun. 29, 2017, the entire content of which is incorporated herein by reference.

TECHNICAL FIELD

The present disclosure relates generally to aircraft controls, and more specifically to skew detection in aircraft components.

BACKGROUND

Modern aircraft are provided with numerous movable components, called control surfaces, which are used generally to control the speed, attitude, and direction of the aircraft. Control surfaces include ailerons, rudders, elevators, leading-edge slats, trailing edge flaps and the like. Certain control surfaces are rotatable along an axis of rotation, thus adjusting their angle relative to the aircraft. Other control surfaces move slidably along tracks or other mechanisms, which may be used to adjust both the angle and the position of the control surface relative to the aircraft.

Movement of control surfaces is typically effected by actuators or other types of motors, and in some cases, multiple actuators are used to move control surfaces. If the actuators are not properly synchronized, movement of the control surfaces can be irregular. Additionally, if some of the actuators malfunction, fail, or become disconnected from the control surface to which they are associated, this can also lead to improper movement of the control surfaces. Some of these failure modes lead to surface asymmetry, skew, or other improper movement of the affected control surfaces, which can cause control issues for the aircraft and potentially pose a safety risk.

As such, there is a need for techniques for detecting improper movement of control surfaces.

SUMMARY

In accordance with a broad aspect, there is provided a method for detecting skew in a wing slat of an aircraft. At least one pair of sensors associated with the wing slat is excited via at least one first electronic device. In response to the exciting and at the at least one first electronic device, at least one pair of signals indicative of at least one pair of state-change counts for the at least one pair of sensors is obtained. The at least one pair of state-change counts is transmitted to at least one second electronic device communicatively coupled to the at least one first electronic device. At the at least one second electronic device, a skew level of the wing slat is determined based on the at least one pair of state-change counts.

In some embodiments, the at least one pair of sensors comprises a first pair of sensors and a second pair of sensors, the at least one first electronic device comprises a first landing-gear-and-steering control unit (LGSCU) and a second LGSCU, obtaining the at least one pair of signals comprises obtaining first and second pairs of signals from the first and second pairs of sensors, determining the at least one pair of distance measurements comprising determining first and second pairs of distance measurements, and determining the skew level of the wing slat is based on the first and second pairs of distance measurements.

In some embodiments, the at least one second electronic device comprises a first slat-flap electronic control unit (SFECU) and a second SFECU, and transmitting the at least one pair of state-change counts to the at least one second electronic device comprises transmitting the first pair of state-change counts to the first SFECU and transmitting the second pair of state-change counts to the second SFECU.

In some embodiments, the method further comprises transmitting the first pair of state-change counts to the second SFECU and transmitting the second pair of state-change counts to the first SFECU.

In some embodiments, the method further comprises determining, at the at least one second electronic device, at least one pair of distance measurements based on the at least one pair of state-change counts, wherein determining the skew level of the wing slat based on the at least one pair of state-change counts comprises determining the skew level of the wing slat based on the at least one pair of distance measurements.

In some embodiments, the method further comprises comparing the skew level to a first skew threshold and when the skew level is beyond the first skew threshold, raising an alert associated with the first skew threshold.

In some embodiments, the method further comprises comparing the skew level to a second skew threshold and when the skew level is beyond the second skew threshold, inhibiting movement of the wing slat.

In some embodiments, exciting the at least one pair of sensors comprises exciting sensors of the at least one pair of sensors to cause at least one change of state to occur for the sensors via an interaction between the sensors and at least one actuating device of a plurality of actuating devices affixed to the aircraft.

In some embodiments, the method further comprises converting, at the at least one first electronic device, the at least one pair of signals to derive the at least one state-change counts in a format readable by the at least one second electronic device, wherein transmitting the at least one pair of state-change counts to the at least one second electronic device comprises transmitting the at least one pair of state-change counts in the format readable by the at least one second electronic device.

In some embodiments, the method further comprises monitoring, at the first electronic device, a health condition for the at least one pair of sensors.

In some embodiments, determining the skew level of the wing slat comprises taking the health condition into account.

In some embodiments, transmitting the first pair of state-change counts to the at least one second electronic device comprises transmitting the at least first pair of state-change counts via at least one data module cabinet (DMC).

In accordance with another broad aspect, there is provided a system for detecting skew in a wing slat of an aircraft. The system comprises at least one first electronic device and at least one second electronic device communicatively coupled to the at least one first electronic device. The first electronic device is for exciting at least one pair of sensors associated with the wing slat; and obtaining, in response to the exciting, at least one pair of signals indicative of at least one pair of state-change counts for the at least one pair of sensors. The at least one second electronic device is for: receiving, from the first electronic device, the at least one pair of state-change counts; and determining, based on the at least one distance measurement, a skew level of the wing slat.

In some embodiments, the at least one first electronic device comprises a first landing-gear-and-steering control unit (LGSCU) and a second LGSCU, obtaining the at least one pair of signals comprises obtaining first and second pairs of signals from the at least one pair of sensors, determining the at least one pair of distance measurements comprising determining first and second pairs of distance measurements, and determining the skew level of the wing slat is based on the first and second pairs of distance measurements.

In some embodiments, the at least one second electronic device comprises a first slat-flap electronic control unit (SFECU) and a second SFECU, the first SFECU is communicatively coupled to the first LGSCU for receiving therefrom the first pair of signals, and the second SFECU is communicatively coupled to the second LGSCU for receiving therefrom the second pair of signals.

In some embodiments, the first SFECU is communicatively coupled to the second LGSCU for receiving therefrom the second pair of signals, and the second SFECU is communicatively coupled to the first LGSCU for receiving therefrom the first pair of signals.

In some embodiments, the at least one second electronic device is further coupled to the at least one first electronic device for determining at least one pair of distance measurements based on the at least one pair of state-change counts, wherein determining the skew level of the wing slat based on the at least one pair of state-change counts comprises determining the skew level of the wing slat based on the at least one pair of distance measurements.

In some embodiments, the at least one second electronic device is further configured for comparing the skew level to a first skew threshold and for, when the skew level is beyond the first skew threshold, raising an alert associated with the first skew threshold.

In some embodiments, the at least one second electronic device is further configured for comparing the skew level to a second skew threshold and for, when the skew level is beyond the second skew threshold, inhibiting movement of the wing slats.

In some embodiments, the system further comprises the at least one sensor and a plurality of actuating devices affixed to the aircraft, the plurality of actuating devices configured for inducing a change of state in the at least one sensor.

In some embodiments, the at least one first electronic device is configured for converting the at least one pair of signals to derive the state-change counts in a format readable by the at least one second electronic device, wherein the at least one second electronic device is communicatively coupled to the at least one first electronic device for receiving the at least one pair of state-change counts in the format readable by the at least one second electronic device.

In some embodiments, the at least one first electronic device is further configured for monitoring a health condition for the at least one pair of sensors.

In some embodiments, determining the skew level of the wing slat comprises taking the health condition into account.

In some embodiments, the system further comprises at least one data module cabinet (DMC), wherein the at least one second electronic device being communicatively coupled to the at least one first electronic device comprises the at least one first electronic device and the at least one second electronic device being communicatively coupled via the at least one DMC.

In accordance with a further broad embodiment, there is provided a system for detecting asymmetric movement of a component of an aircraft. The system comprises at least one first electronic device and at least one second electronic device communicatively coupled to the at least one first electronic device. The first electronic device is for exciting at least one pair of sensors associated with the component and for obtaining, in response to the exciting, at least one pair of signals indicative of at least one pair of state-change counts for the at least one pair of sensors. The second electronic device is for receiving, from the first electronic device, the at least one pair of state-change counts and for determining, based on the at least one pair of state-change counts, a level of positional imbalance for the component.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which:

FIG. 1 is a diagram of an example aircraft.

FIG. 2A is a diagram of an example aircraft leading-edge slat assembly.

FIG. 2B is a diagram of a skewed version of the slat assembly of FIG. 2A.

FIG. 3A is an illustration of an example arrangement of actuating targets on an example track.

FIG. 3B is an illustration of an example interaction between one of the actuating targets of FIG. 3A and an example sensor.

FIG. 3C is a schematic representation of an example dual-channel arrangement of actuating devices.

FIG. 4B is a schematic representation of an example architecture of a single channel slat skew detection system.

FIG. 6 is a flowchart of a method for detecting skew in a wing slat of an aircraft according to an embodiment.

It will be noted that throughout the appended drawings, like features are identified by like reference numerals.

DETAILED DESCRIPTION

Figure 4A:
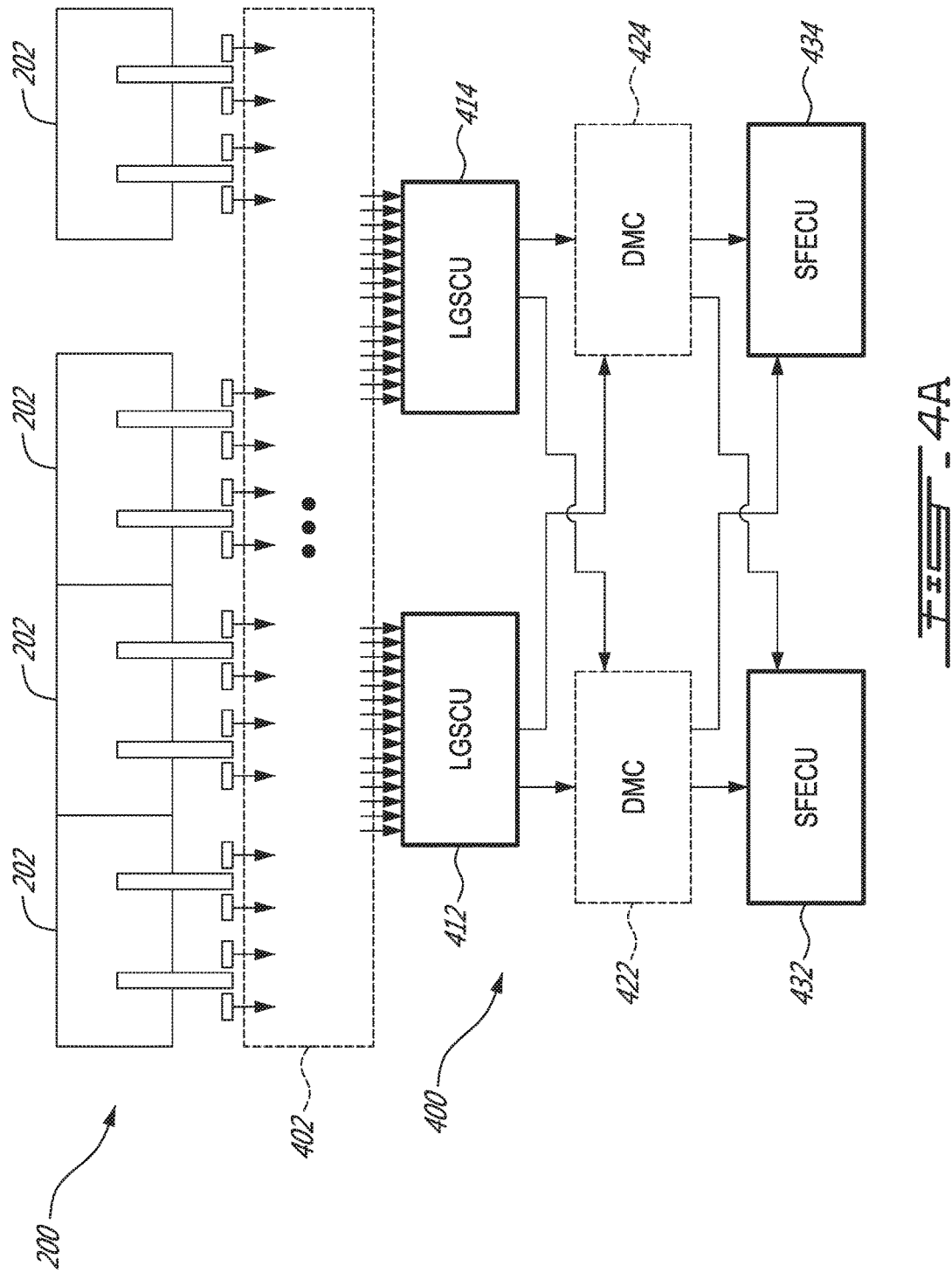
FIG. 4A is a schematic representation of an example a slat skew detection system.

With reference to FIG. 1, an aircraft 100, having a fuselage 110, is equipped with a pair of wings 140, engines 150, and a tail 160. The aircraft 100 can be any type of aircraft, including propeller planes, jet planes, turbojet planes, turbo-propeller planes, turboshaft planes, gliders, and the like. The fuselage 110 has a cockpit 120, which may be positioned at any suitable location on the aircraft 100, for example at a front portion of the fuselage 110. The cockpit 120 is configured for accommodating one or more pilots who control the aircraft 100 by way of one or more operator controls (not illustrated). The operator controls may include any suitable number of pedals, yokes, steering wheels, centre sticks, flight sticks, levers, knobs, switches, and the like.

The fuselage 110 may be a composite fuselage, a metallic fuselage, or may use any other suitable material. For example, the fuselage 110 is made from one or more composite materials, including fiberglass, carbon fiber, polymers, and the like. In certain embodiments, the fuselage 110 is made of a plurality of layers of composite materials. In another example, the fuselage 110 is made from one or more metallic materials, including aluminium, steel, titanium, and the like. In a further example, the fuselage combines composite materials, metallic materials, and any other suitable material, including wood, fabric, etc. The wings 140 and the tail 160 can also be made of any one or more suitable materials, which may be the same material(s) as used for the fuselage 110, or may be a different material or composition of materials.

In addition, the wings 140 are equipped with a plurality of control surfaces, including leading-edge slats 200. The slats 200 are control surfaces which alter the lift augmentation of the wings 140 of the aircraft 100. In particular, the slats 200 are configured for being positioned in a retracted mode, for example during many flight phases, and a deployed mode, where altered wing aerodynamic characteristics are provided, for example during take-off and landing. In some embodiments, the slats 200 are configured to be deployed or retracted along a spectrum between a fully-deployed position and a fully-retracted position. The wings 140 may also be equipped with other control surfaces, for example flaps, and the like. Although the foregoing discussion focuses primarily on the leading-edge slats 200, it should be noted that the description may be applied to any other control surfaces and flight components generally, including the flaps.

By altering the wing aerodynamic characteristics of the aircraft 100, the slats 200 can adjust various flight requirements for the aircraft 100. For example, when the slats 200 are deployed, the aircraft 100 is able to fly at lower speeds and perform take-off or landing in shorter distances. In another example, slats 200 are deployed during take-off and landing maneuvers. However, during other flight phases, the slats 200 are typically retracted to minimize drag.

With reference to FIG. 2A, the slats 200 are composed of one or more slat assemblies 202, an example of which is shown. The slat assembly 202 is made up of a slat panel 212 and a pair of tracks 222, 224. The slat panel 212 and the tracks 222, 224, are configured for being mated in order to direct the movement of the slat panel 212 along the tracks 222, 224, for example to allow the slat panel to transition between the deployed and retracted positions. Although the embodiment shown in FIG. 2 includes two tracks 222, 224, any suitable number of tracks may be used to guide the motion of the slat panel 212.

The slat panel 212 has first and second side ends 214, 216 and a front end 218, and may be made of any suitably rigid material. For example, the slat panel is made of any one or more composite materials, including fiberglass, carbon fiber, polymers, and the like, or any suitable metal, for example titanium, aluminium, and the like. The slat panel 212 has defined therein one or more suitable attachment features for mating with the tracks 222, 224, which is discussed in greater detail hereinabove. The number of attachments may be 2, 3, 4, or any other suitable number, and varies to match the number of tracks.

Although the slat panel 212 is illustrated as having a rectangular shape, it should be noted that this is for ease of illustration. The slat panel 212 may take on any suitable shape, size, thickness, orientation, and the like, as is conducive to adjusting the wing lift of the aircraft 100.

The tracks 222, 224 serve to guide the movement of the slat panel 212, thereby allowing the slat assembly 202 to move between retracted and deployed positions. In some embodiments, the tracks 222, 224 include attachment features which are configured for mating with complementary attachment features located on a surface of the slat panel 212. For example, the recesses in the slat panel 212 are fitted with bearings to facilitate the displacement of the slat panel 212 via projections along the tracks 222, 224. In other embodiments, the tracks 222, 224 are configured for being slidably inserted into bores located within the slat panel 212. Still other embodiments of the tracks 222, 224 are considered.

The slat panel 212 moves along, or together with, the tracks 222, 224 via the action of one or more motors, which drive one or more actuators. The actuators may act on the slat panel 212 itself, on the tracks 222, 224, or on both the slat panel 212 and the tracks 222, 224. Any suitable type of actuator may be used, including electrical actuators, hydraulic actuators, rotary geared actuators, and the like. In some embodiments, the actuators are located in or otherwise attached to the slat panel 212. In other embodiments, the actuators are located within the wings 140 and are coupled to the slat panel 212 and/or the tracks 222, 224 in any suitable fashion. In still further embodiments, the actuators are located in the fuselage 110 of the aircraft 100.

With reference to FIG. 2B, if the actuators are not properly synchronized, if one or more of the actuators fails or malfunctions, or if there is any failure in the drive mechanism between the actuator and the slat panel 212, the slat panel 212 may move asymmetrically, thereby developing skew. For example, an actuator may jam, or become disconnected from the slat panel 212, thereby causing asymmetric movement of the slat panel 212. In some embodiments, the disconnection of the actuator may in turn cause a jam.

Put generally, the slat panel 212, or the slat assembly 202 as a whole, is considered to be skewed when a portion of the front end 218 near the first side end 214 is not aligned with a portion of the front end 218 near the second side end 216, and vice-versa. In FIG. 2B, the portion of the front end 218 near the first side end 214 defines a plane 204, and the portion of the front end 218 near the second side end 216 defines a plane 206. Since the planes 204, 206 are not aligned, the slat panel 212 is said to be skewed.

In order to detect the development of skew in the slat panel 212, the slat assembly 202 is equipped with one or more pairs of sensors. The pair(s) of sensors are configured for generating signals that are representative of distance measurements which can be used to detect the presence of skew in the slat panel 212. In the embodiment shown in FIGS. 2A and 2B, the slat assembly 202 includes a first pair of sensors 232, 234, and a second pair of sensors 242, 244, but other embodiments may include fewer or more pairs of sensors. The sensors may be any suitable type of sensor for measuring movement, distance, proximity, and the like. In some embodiments, a slat assembly 202 which includes multiple pairs of sensors will use sensors of the same type, for example, to reduce the complexity of the slat assembly 202. In other embodiments, a slat assembly 202 which includes multiple pairs of sensors will use various different types of sensors, for example to work in different environments.

With reference to FIGS. 3A-C, in some embodiments, the sensors 232, 234 and 242, 244 are configured for detecting a distance travelled by the slat panel 212 along each of, or together with each of, the tracks 222, 224. As illustrated in FIG. 3A, the track 222 may be provided with an actuating structure disposed lengthwise along the track 222. The actuating structure includes a plurality of actuating devices, for example the sensor-actuating targets 310. In some embodiments, the targets 310 are positioned in a recessed portion of the track 222. For example, the targets 310 are affixed to the track 222 via an adhesive or other fastener. In another example, the targets 310 are embedded or otherwise integrated within the track 222. The targets 310 may be configured for causing a change in a state of one or more of the sensors 232, 234, 242, 244 when the targets 310 are brought into proximity with the sensors 232, 234, 242, 244.

When the actuators of the slat assembly 202 cause movement in the slat panel 212 and the track 222, the targets 310 may transit past one of the sensors 232, 234, 242, 244, for example the sensor 232. When a particular one of the targets $310_1$ is brought into proximity with the sensor 232, the state of the sensor 232 is changed. By tracking a count of state changes, a distance travelled by the slat panel 212 can be determined. The signals produced by the sensors 232, 234 and 242, 244 provide indications of state changes, or of state-change counts, from which distance measurements may be derived.

In some embodiments, only one set of targets 310 is provided on each of the tracks 222, 224. In other embodiments, as shown in FIG. 3C, the track 222 comprises a pairs of targets 310 and 320, for example one on each side of the tracks 222. In some embodiments, the targets 310, 320 on each side of the track 222 are staggered or interleaved, which may improve the resolution of the skew detection. The actuating devices can be any suitable element configured for interacting with the sensors 232, 234, 242, 244 to induce a change of state in the at least one sensor. For example, the targets 310 are magnetic elements which cause a magnetic-induced state in the sensors 232, 234, 242, 244 to be altered. In another example, the targets 310 are optically-reflective elements, for instance a bar code, QR code, or other visual indicator, which cause an optical-signal-induced state in the sensors 232, 234, 242, 244 to be altered when the targets 310 reflect an optical signal emitted by the sensors 232, 234, 242, 244. Still other types of interactions between the targets 310 and the sensors 232, 234, 242, 244 are considered. For example, a plurality of dots are placed on the tracks 222, 224, and the sensors 232, 234, 242, 244 experience a change of state upon detecting a dot passing by.

In some embodiments, the sensors 232, 234, 242, 244 are provided in pairs (232 and 234, 242 and 244) because determining whether the slat panel 212 is skewed is based on a pair of readings. Sensors belonging to a common pair may be associated to one another such that the pairs of signals produced by sensors of a common pair are linked or otherwise considered to also be associated to one another. In some embodiments, sensors of a common pair encode or transmit the pairs of signals to further components on a same frequency, or using a common frequency band. In other embodiments, sensors of a common pair are configured to encode or transmit the pairs of signals to further components using a common identifier, which, for example, is provided to the sensors at some initialization phase. Still other approaches for associating sensors of a common pair are considered.

In embodiments where the slat assembly 202 includes one pair of sensors, the sensors may be located near or adjacent to the side ends 214, 216, or may be located near or adjacent to the tracks 222, 224. For example, the sensors of the pair of sensors are located between respective side ends 214, 216 and respective tracks 222, 224. In another example, the sensors of the pair of sensors are both located between the tracks 222, 224, equally offset from a midpoint of the slat panel 212. Still other configurations for the sensors, for example aligned with and superposed or recessed vis-à-vis the tracks 222, 224, are also considered.

In some embodiments where the slat assembly 202 includes two pairs of sensors, for example, in the embodiment shown in FIGS. 2A and 2B, the two pairs of sensors are interleaved. For example, the first pair of sensors 232, 234, has the first sensor 232 located between the side edge 214 and the track 222, and the second sensor 234 located between the tracks 222, 224, adjacent the track 224, and the second pair of sensors 242, 244 has the first sensor 242 located between the side edge 216 and the track 224, and the second sensor 244 located between the tracks 222, 224, adjacent the track 222. This arrangement of the sensors may improve the resolution of skew detection, and provide system redundancy. In other embodiments where the slat assembly 202 includes two pairs of sensors, the two pairs of sensors follow an inside-outside pattern, in which sensors of the first pair are located between respective side ends 214, 216 and respective tracks 222, 224, and sensors of the second pair are located between the tracks 222, 224, equally offset from a midpoint of the slat panel 212. Still other sensor configurations for slat assemblies 202 with a single pair of sensors, two pairs of sensors, or three-or-more pairs of sensors are considered.

With reference to FIG. 4A, the slats 200 of one of the wings 140 are composed of a plurality of slat assemblies 202, each of which is provided with respective sensors 232, 234, and 242, 244. In some embodiments, the sensors 232, 234, and 242, 244 of each of the slat assemblies 202 are configured for obtaining respective pairs of signals indicative of distances travelled by their respective slat panels 212, which can then be used to detect whether any of the slat panels 212 are exhibiting skew. In order to process the pairs of signals obtained from the sensors 232, 234, and 242, 244, the slats 200 are configured for interfacing with a slat skew detection system (SSDS) 400 via an interface 402. It should be noted that although the embodiment illustrated in FIG. 4A shows the slats 200, interface 402, and SSDS 400 for one of the wings 140, a similar arrangement may be made in any other wing 140, or in any other component of the aircraft 100 where slat assemblies 202 cooperate to define leading-edge slats 200, or where other components of the aircraft 100 are susceptible to develop skew or other positional imbalances, or more generally to move asymmetrically, for example flaps of the aircraft 100. In addition, the slats 200 of each wing 140 may have more or fewer slat assemblies 202, and may contain fewer or more sensors per slat assembly 202.

The interface 402 includes one or more channels configured for transmission to and from the pairs of sensors. The number of channels of the interface 402 depends on the number of pairs of sensors in each slat assembly 202. In the embodiment of FIG. 4A, where each slat assembly has two pairs of sensors 232, 234 and 242, 244, the interface 402 has two channels. In some other embodiments, the interface 402 is provided with a single channel for transmission to and from the pairs of sensors.

The interface 402 serves to connect the various sensors 232, 234, and 242, 244 of the slat assemblies 202 which compose the slats 200 with the SSDS 400. The interface 402 may include any suitable number of wired and/or wireless connections for communicatively coupling the sensors 232, 234, and 242, 244 and the SSDS 400. In some embodiments, the interface consists of one or more channels, with each channel being associated with a respective pair of sensors. For example, in embodiments where each of the slat assemblies 202 includes two pairs of sensors, namely the sensors 232, 234, and 242, 244, the interface includes two channels, one for each of the pairs of sensors. In embodiments where each of the slat assemblies 202 includes one pair of sensors, the interface includes one channel. The interface may use any suitable wired or wireless communication protocol and/or standard, as appropriate.

The SSDS 400 is configured for interfacing with the interface 402 for exciting the sensors 232, 234, and 242, 244 of each of the slat assemblies 202, for receiving pairs of signals from the sensors 232, 234, and 242, 244 in response to exciting the sensors 232, 234, and 242, 244, and for determining a level of skew for each of the slat panels 212. In the embodiment shown in FIG. 4A, the SSDS 400 is composed of a pair of landing-gear-and-steering control units (LGSCUs) 412. 414, optionally a pair of data module cabinets (DMC) 422, 424, and a pair of slat-flap electronic control units (SFECUs) 432, 434. It should be noted that the embodiment of the SSDS 400 depicted in FIG. 4A is configured for use with slat assemblies 202 which each include two pairs of sensors 232, 234, and 242, 244, with each pair communicating on dedicated channels. In embodiments where the slat assemblies have only one pair of sensors, or where multiple pairs of sensors communicate on a common channel, the SSDS 400 is composed of one LGCSU, optionally one DMC, and one SFECU.

The LGSCUs 412, 414 are communicatively coupled to the sensors 232, 234, and 242, 244 via the interface 402. In this embodiment, the LGSCU 412 is assigned to a first channel to interface with the sensors 232 and 234, and the LGSCU 414 is assigned to a second channel to interface with the sensors 242, 244. Each of the LGSCUs 412, 414 comprises hardware and/or software components which allow the LGSCUs 412, 414 to excite the sensors 232, 234 and 242, 244 and to communicate therewith. In some embodiments, the LGSCUs 412, 414 are provided with the relevant hardware/software components because the LGSCUs 412, 414 are also configured for interacting with other systems of the aircraft 100 which also comprise sensors. For example, the LGSCUs 412, 414 are configured for interfacing with sensors used in slat and flap outboard brake (OBB) modules, landing gear systems, doors indication systems, and the like. Since the LGSCUs 412, 414 are already equipped for interfacing with sensors used in other modules, providing the LGSCUs 412, 414 with the necessary communication channels for interfacing with the sensors 422, 424 and 442, 444 can help to avoid providing the same hardware and software features required to drive and read the sensors in other electronic controllers such as the SFECUs 432, 434.

The LGSCUs 412, 414 are configured for exciting the sensors 232, 234, and 242, 244, thereby causing the sensors 232, 234, and 242, 244 to obtain the pairs of signals. In some embodiments, the LGSCUs 412, 414 excite the sensors 232, 234, and 242, 244 via an electrical pulse or other electrical signal. In some other embodiments, the LGSCUs 412, 414 excite the sensors 232, 234, and 242, 244 via an optical pulse or other optical signal. Still other techniques for exciting the sensors 232, 234, and 242, 244 are considered. In some embodiments, the LGSCUs 412, 414 provide certain information to the sensors 232, 234, and 242, 244, for example a requested rate of acquisition of the pairs of signals, or a particular technique for acquisition of the pairs of signals. In embodiments where the sensors 232, 234, and 242, 244 include a plurality of types of sensors, the LGSCUs 412, 414 include information regarding the type of sensor to be used for acquisition of the signals.

The LGSCUs 412, 414 are additionally configured for obtaining the pairs of signals from the sensors 232, 234, and 242, 244 in response to the excitation. The pairs of signals may be obtained as analog signals having any suitable frequency, magnitude, and encoding, or may be obtained as digital signals. In embodiments where the LGSCUs 412, 414 obtain the pairs of signals as analog signals, the LGSCUs are further configured for performing an analog-to-digital conversion of the pairs of signals, for example to a standard or format conducive to being shared with other components of the SSDS 400, including the SFECUs 432, 434.

The LGSCUs 412, 414 are further configured for deriving from the signals state-change counts or other information indicative of a distance travelled by the slat panel 212, and for providing the pairs of state-change counts to the SFECUs 432, 434. In some embodiments, each LGSCU 412, 414 provides the state-change counts obtained on the channels associated with the respective LGSCU 412, 414 to the SFECU 432, 434 which is also associated to that channel. For example, if LGSCU 412 and SFECU 432 are both associated with a first channel, and if LGSCU 414 and SFECU 434 are both associated with a second channel, the LGSCU 412 provides the state-change counts obtained on the first channel, associated with sensors 232, 234 to the SFECU 432, and the LGSCU 414 provides the state-change counts obtained on the second channel, associated with sensors 242, 244 to the SFECU 434. In other embodiments, the LGSCUs 412, 414 are configured for providing the pairs of state-change counts associated with their respective channels to both SFECUs 432, 434.

Optionally, the SSDS 400 includes the DMCs 422, 424, and the pairs of state-change counts are transmitted from the LGSCUs 412, 414 to the SFECUs 432, 434 via the DMCs 422, 424. The DMCs may be any suitable routing device for effecting the transfer of information between various electronic components of the aircraft 100, including the LGSCUs 412, 414 and the SFECUs 432, 434. In some embodiments, the LGSCUs 412, 414 provide the pairs of state-change counts associated with their respective channels to an associated one of the DMCs 422, 424. For example, the LGSCU 412 provides the state-change counts of the sensors 232, 234 to the DMC 422, and the LGSCU 414 provides the state-change counts of the sensors 242, 244 to the DMC 424. The DMCs 422, 424 then provide the pairs of state-change counts to the SFECUs 432, 434 as appropriate. In other embodiments, the LGSCUs 412, 414 provide the pairs of state-change counts associated with their respective channels to both DMCs 422, 424, and the DMCs provide the pairs of state-change counts to the SFECUs 432, 434 as appropriate.

The SFECUs 432, 434 are configured for obtaining the pairs of state-change counts from the LGSCU 412, 414 or from the DMCs 422, 424. In some embodiments, the SFECUs 432, 434 receive the pairs of state-change counts substantially in real-time. In other embodiments, the SFECUs 432, 434 provide the LGSCU 412, 414 or the DMCs 422, 424 with requests for state-change counts and receive the pairs of state-change counts in response to the requests. For example, the SFECUs 432, 434 make requests for state-change counts on a periodic basis, or in response to one or more internal triggers of the SFECUs 432, 434, for example a trigger indicating that there may be a problem with the slats 200. Because the LGSCUs 412, 414 act as an intermediary between the sensors 232, 234 and 242, 244, and the SFECUs 432, 434, the SFECUs 432, 434 are not required to include the necessary hardware and/or software components for exciting and reading state changes of the sensors 232, 234 and 242, 244. This, in turn, lightens the hardware and software requirements for the SFECUs 432, 434, and can help to reduce unnecessary redundancy in the aircraft 100.

Once the pairs of state-change counts are received, the SFECUs 432, 434 determine a skew level of the slats 200 based on the pairs of state-change counts. In some embodiments, the SFECUs 432, 434 perform a conversion of the state-change counts to a distance measurement. In other embodiments, the state-change counts are used as proxies for distance. In some embodiments, the pairs of state-change counts for each of the slat assemblies 202 are compared to determine the skew level of the slat panel 212. For example, in embodiments where the slat assemblies 202 include the sensors 232, 234 and 242, 244, the state-change counts of the first pair of state-change counts, obtained from the sensors 232, 234, are compared to one another, and the state-change counts of the second pair of state-change counts, obtained from the sensors 242, 244, are compared to one another. In other embodiments, state-change counts obtained by sensors of corresponding slat assemblies 202 on left and right wings 140 are compared to determine the skew level. In an example where the slat assemblies include one pair of sensors, the state-change counts produced by the pair of sensors are compared to one another. These comparisons are then used to determine a skew level for the slat assembly 202. Still other types of comparisons and algorithms may be used to determine the skew level of the slat panel 212 of the slat assembly 202.

In some embodiments, the skew level is a binary value, either "skewed" or "not skewed", for example based on a particular threshold. In other embodiments, the skew level is expressed as an angle of the slat panel 212 relative to a reference axis. In further embodiments, other schemes are used for expressing the skew level.

In some embodiments, the SFECUs 432, 434 are further configured for determining whether the skew of the slat panels 212 require further action. For example, the skew level of each of the slat panels 212 is compared to one or more skew thresholds. When the skew level of a particular slat panel 212 is beyond a first example skew threshold, an alert is raised or a message is sent to a crew of the aircraft, for example to warn the crew about the skew condition. When the skew level of the particular slat panel 212 is beyond a second example skew threshold, the SFECUs 432, 434 are configured for inhibiting movement of the slat panel 212 and/or of the slats 200 generally, to avoid further exacerbating the skew level. For example, any skew level indicative of a skew of less than 5° falls within the first example skew level, and any skew level indicative of a skew of greater than 5° falls within the second skew threshold. Any suitable number of skew thresholds may be provided, each having a different degree of severity and an associated response based on the severity.

For example, in response to determining that the skew level of a particular slat panel 212, or of symmetrically located pair of slat panels 212 across wings 140, is beyond the skew threshold, the SFECUs 432, 434 is configured for controlling the actuator or actuators which effect movement of the slat panel 212 to prevent the slat panel 212 from moving beyond a certain point or level, at all, or to inhibit any other type of movement. In another example, the SFECUs 432, 434 are configured for activating a movement lock on the slat panel 212 and/or on the tracks 222, 224, as appropriate. Still other methods for inhibiting movement of the slat panels 212 are considered.

In some further embodiments, the LGSCUs 412, 414 are configured for monitoring a health condition of each of the sensors 232, 234 and 242, 244. For example, the LGSCUs 412, 414 maintain a record of state-change counts obtained from the sensors 232, 234, and 242, 244, for instance via a database or other storage media. The LGSCUs 412, 414 are configured for performing various analyses on the state-change counts to detect malfunction of one or more of the sensors 232, 234 and 242, 244, for example if one of the sensors 232, 234 and 242, 244 is continually reporting state-changes which are deemed impossible in light of the remaining values. The LGSCUs 412, 414 may also maintain a record of health conditions for each of the sensors 232, 234 and 242, 244 of each of the slat assemblies 202, and raise alerts to operators indicative of malfunction of the sensors 232, 234 and 242, 244. Alternatively, or in addition, the sensors 232, 234, and 242, 244 are configured for performing self-diagnostic tests or for otherwise self-reporting health conditions to the LGSCUs 412, 414. In some embodiments, the LGSCUs 412, 414 provide the SFECUs 432, 434 with the health conditions for the sensors 232, 234 and 242, 244, and the SFECUs 432, 434 are configured for taking into account the health conditions of the sensors 232, 234 and 242, 244 when determining the skew levels for the slat panels 212. For example, one or more of the state-change counts may be discarded, or may be estimated based on the remaining state-change counts.

With reference to FIG. 4B, an embodiment of a single-channel SSDS 405 is shown. In this embodiment, the SSDS 405 is configured for obtaining pairs of state-change counts from slat assemblies 202 having one pair of sensors 482, 484. The SSDS 405 includes one LGSCU 462, optionally one DMC 472, and one SFECU 482, each of which is configured for operating substantially similarly to the LGSCU 412, 414, DMC 422, 424, and SFECU 432, 434, respectively, as described hereinabove.

In placing the LGSCUs 412, 414 or 462 as an intermediary for the communication between the sensors 232, 234 and 242, 244 and the SFECUs 432, 434 or 482, any hardware and/or software required for ensuring proper operation of the sensors 232, 234 and 242, 244, and proper interpretation of signals received therefrom, need only be provided within the LGSCUs 412, 414 or 462. Since the LGSCUs 412, 414 or 462 already include the necessary hardware/software elements for communication with other sensors, for example used in other modules of the aircraft 100, the LGSCUs 412, 414 or 462 are already equipped for interfacing with the sensors 232, 234 and 242, 244. This in turn reduces the hardware/software requirements for the SFECUs 432, 434 or 482, which need only have sufficient hardware and/or software for communicating with the LGSCUs 412, 414 or 462.

Figure 5:
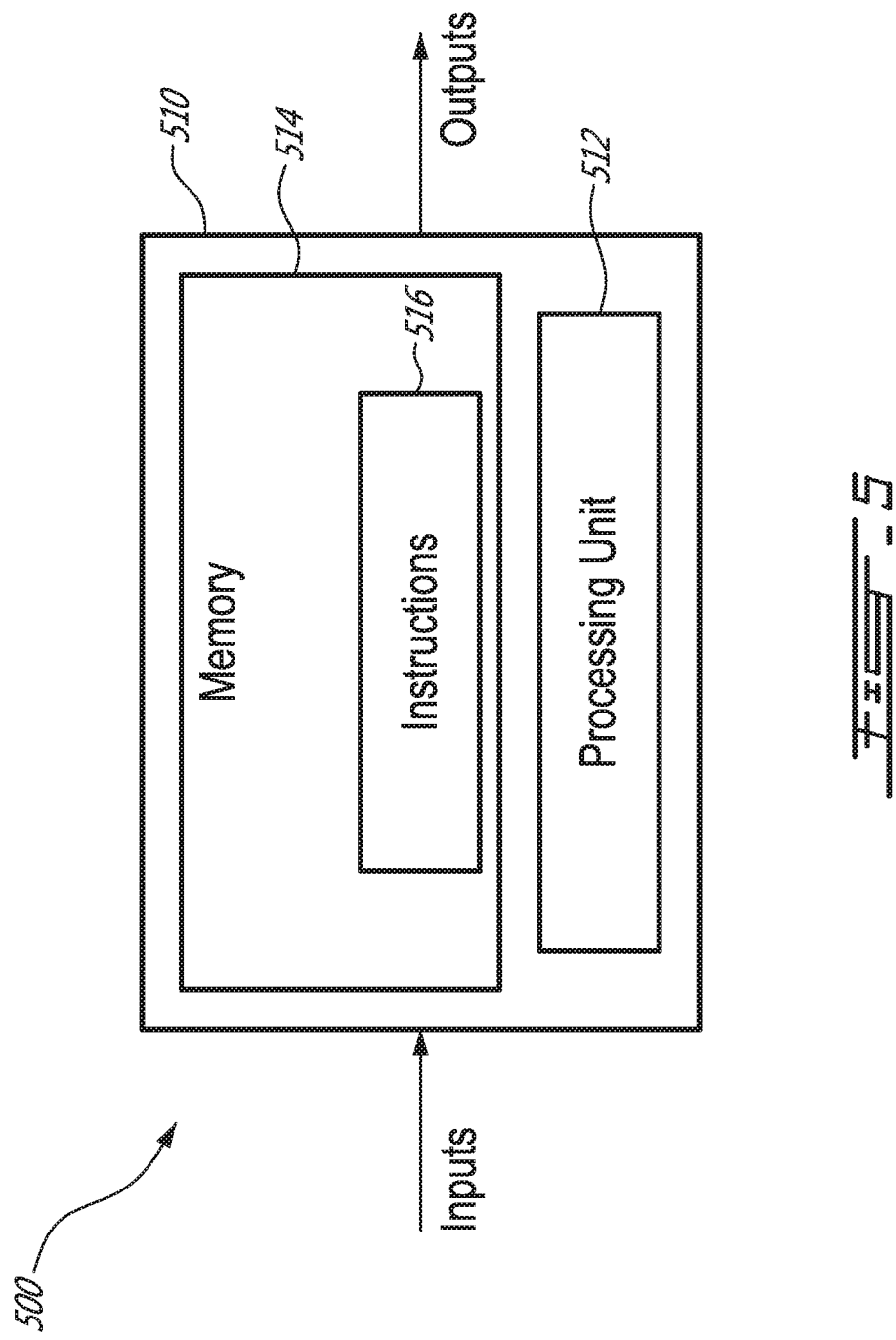
FIG. 5 is a block diagram of an example computing system.

With reference to FIG. 5, one or more of the LGSCUs 412, 414 or 462, the DMCs 422, 424, or 442, and the SFECUs 432, 434, or 482, may be implemented by a computing device 510, comprising a processing unit 512 and a memory 514 which has stored therein computer-executable instructions 516. The processing unit 512 may comprise any suitable devices configured to cause a series of steps to be performed so as to implement the method 500 such that instructions 516, when executed by the computing device 510 or other programmable apparatus, may cause the functions/acts/steps specified in the methods described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium such as, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory 514 may comprise any storage means (e.g., devices) suitable for retrievably storing the computer-executable instructions 516 executable by processing unit 512.

With reference to FIG. 6, the SSDS 400, or the SSDS 405, is configured for implementing a method 600 for detecting skew in a wing slat of an aircraft, for example the slats 200 of the aircraft 100. At step 602, at least one pair of sensors, which may include the sensors 232, 234 and 242, 244, which are associated with a wing slat, for example the slat assembly 212, is excited via at least one first electronic device, for example one or more of the LGSCUs 412, 414. The excitation may take the form of one or more electrical pulses, one or more optical pulses, or any other suitable form.

At step 604, in response to the excitation, one or more pairs of signals are obtained at the LGSCUs 412, 414, from the sensors 232,234 and 242, 244. The pairs of signals can be received as an analog signal or as a digital signal, as appropriate. The signals are representative of a distance travelled by the slat panel 212, for example in the form of a count of state-changes experienced by the sensors 232, 234 and 242, 244 due to the targets 310.

Optionally, at step 606, the pair of signals are converted to derive the state-change counts. For example, when the pairs of signals are received as an analog signal, the pairs of signals are converted to a format in which the state-change counts are readable to at least one second electronic device, for example the SFECUs 432, 434. The format can be any suitable digital format for the state-change counts, including any suitable encoding, word-length, and the like.

At step 608, optionally health conditions for the pairs of sensors 232, 234 and 242, 244 are monitored by the LGSCUs 412, 414. In some embodiments, monitoring the health conditions of the pairs of sensors comprises obtaining self-diagnostic data from the sensors 232, 234, and 242, 244. In other embodiments, the LGSCUs 412, 414 are configured for maintaining records of pairs of state-change counts and verifying current pairs of state-change counts against trends and/or other analytics obtained from the records of pairs of state-change counts. In some embodiments, the LGSCUs 412, 414 are configured for storing records in and obtaining records from one or more databases. In addition, in some embodiments the health conditions are stored in the databases for later consultation.

At step 610, the state-change counts are transmitted to the second electronic device, which may be the SFECUs 432, 434. Optionally, the pairs of state-change counts are transmitted via DMCs, for example the DMCs 422, 424. The transmission of the pairs of state-change counts from the LGSCUs 412, 414 to the SFECUs 432, 434, whether via DMCs 422, 424 or not, may be performed via any suitable communication system, including wired and wireless communication protocols and standards, as appropriate.

Optionally, at step 612, at least one pair of distance measurements are determined based on the state-change counts transmitted by the LGSCUs 412, 414. The SFECUs 432, 434 may use any suitable algorithm for deriving the distance measurements from the state-change counts. In some embodiments, the distance measurements are adjusted based on the health conditions monitored by the LGSCUs 412, 414.

At step 614, a skew level of the slats 200, and more particularly of each of the slat assemblies 202 which compose the slats 200, is determined based on the pair of the state-changes counts or on the pairs of distance measurements when step 612 is performed. The determination of the skew level is performed by the SFECUs 432, 434. In some embodiments, the SFECUs 432, 434 rejects one or more of the state-change counts and/or distance measurements based on the health condition for the pairs of sensors 232, 234 and 242, 244. Other types of accounting for the health conditions are also considered. The skew level can be a binary value, a variable indicative of an angle of the slat panel 212 relative to a predetermined reference, or any other suitable value. In some embodiments, the skew level may also be stored in the aforementioned databases.

At step 616, optionally the skew level is compared to a skew threshold, for example within the SFECUs 432, 434. The skew threshold may be a predetermined skew threshold, or may be a dynamically varying skew threshold, for example based on external conditions and/or flight conditions for the aircraft 100. In some embodiments, different skew thresholds are provided or obtained dynamically for each of the skew assemblies 202. In embodiments, where the skew thresholds are dynamic, the SFECUs 432, 434 are configured for obtaining the dynamic skew thresholds. In some embodiments, different skew thresholds are associated with different skew levels, and have corresponding consequences.

At decision 618, optionally a determination is made regarding whether the skew level is beyond one or more skew thresholds. For example, a first skew threshold is associated with a lower criticality skew level, and a second skew threshold is associated with a higher criticality skew level. In another example, only one skew threshold is considered, for instance the higher criticality skew threshold. If the skew level is below the skew threshold(s), the method returns to some previous step, for example step 602. If the skew level is above the skew threshold(s), the method proceeds to step 620.

At step 620, optionally one or more countermeasures associated with the skew thresholds are implemented. For example, when the skew level is beyond the higher criticality skew threshold, movement of slat assemblies 202 for which the skew level is beyond the severe skew threshold is inhibited, for example via the SFECUs 432, 434. For example, the SFECUs 432, 434 are configured for controlling one or more actuators configured for effecting movement of the slat panels 212 to inhibit the actuators from moving the slat panels 212. In some embodiments, the actuators are caused to restrict movement of the slat panels 212 to a predetermined range, for example based on the skew level of the slat assembly 202. In other embodiments, a lock or other mechanism is used to prevent movement of the slat panels 212 and/or of the tracks 222, 224. Still other mechanisms for inhibiting movement of the slat assemblies 202 are considered.

In another example, when the skew level is above the lower criticality threshold but below the higher criticality skew threshold, an alert is raised, and a message or other communication is provided to a crew or other relevant authority of the aircraft 100. In some embodiments, the message includes an indication of the skew level, an indication of potential causes and/or solutions, and the like.

The methods and systems for detecting skew in a wing slat of an aircraft described herein may be implemented in a high-level procedural or object-oriented programming or scripting language, or a combination thereof, to communicate with or assist in the operation of a computer system, for example the computing device 410. Alternatively, the methods and systems for detecting skew in a wing slat of an aircraft described herein may be implemented in assembly or machine language. The language may be a compiled or interpreted language. Program code for implementing the methods and systems for detecting skew in a wing slat of an aircraft described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting skew in a wing slat of an aircraft described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for detecting skew in a wing slat of an aircraft disclosed herein, as well as the aircraft itself, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for detecting skew in a wing slat of an aircraft, comprising:
   exciting at least one pair of sensors associated with the wing slat via at least one first electronic device;
   obtaining, in response to the exciting and at the at least one first electronic device, at least one pair of signals indicative of at least one pair of state-change counts for the at least one pair of sensors;
   monitoring, at the first electronic device, a health condition for the at least one pair of sensors;
   transmitting the at least one pair of state-change counts to at least one second electronic device communicatively coupled to the at least one first electronic device; and
   determining, at the at least one second electronic device, a skew level of the wing slat based on the at least one pair of state-change counts and taking the health condition into account.

2. The method of claim 1, wherein the at least one pair of sensors comprises a first pair of sensors and a second pair of sensors, wherein the at least one first electronic device comprises a first landing-gear-and-steering control unit (LGSCU) and a second LGSCU, and wherein obtaining the at least one pair of signals comprises obtaining first and second pairs of signals from the first and second pairs of sensors.

3. The method of claim 2, wherein the at least one second electronic device comprises a first slat-flap electronic control unit (SFECU) and a second SFECU, and wherein transmitting the at least one pair of state-change counts to the at least one second electronic device comprises transmitting the first pair of state-change counts to the first SFECU and transmitting the second pair of state-change counts to the second SFECU.

4. The method of claim 3, further comprising transmitting the first pair of state-change counts to the second SFECU and transmitting the second pair of state-change counts to the first SFECU.

5. The method of claim 1, further comprising determining, at the at least one second electronic device, at least one pair of distance measurements based on the at least one pair of state-change counts, wherein determining the skew level of the wing slat based on the at least one pair of state-change counts comprises determining the skew level of the wing slat based on the at least one pair of distance measurements.

6. The method of claim 1, further comprising:
   comparing the skew level to a first skew threshold; and
   when the skew level is beyond the first skew threshold, raising an alert associated with the first skew threshold.

7. The method of claim 1, further comprising:
   comparing the skew level to a first skew threshold; and
   when the skew level is beyond the first skew threshold, inhibiting movement of the wing slat.

8. The method of claim 1, wherein exciting the at least one pair of sensors comprises exciting sensors of the at least one pair of sensors to cause at least one change of state to occur for the sensors via an interaction between the sensors and at least one actuating device of a plurality of actuating devices affixed to the aircraft.

9. The method of any of claim 1, further comprising converting, at the at least one first electronic device, the at least one pair of signals to derive the at least one state-change counts in a format readable by the at least one second electronic device, wherein transmitting the at least one pair of state-change counts to the at least one second electronic device comprises transmitting the at least one pair of state-change counts in the format readable by the at least one second electronic device.

10. The method of claim 1, wherein transmitting the first pair of state-change counts to the at least one second electronic device comprises transmitting the at least first pair of state-change counts via at least one data module cabinet (DMC).

11. A system for detecting skew in a wing slat of an aircraft, comprising:
   at least one first electronic device for:
      exciting at least one pair of sensors associated with the wing slat;

monitoring a health condition for the at least one pair of sensors; and obtaining, in response to the exciting, at least one pair of signals indicative of at least one pair of state-change counts for the at least one pair of sensors; and at least one second electronic device communicatively coupled to the at least one first electronic device for:

receiving, from the first electronic device, the at least one pair of state-change counts; and determining, based on the at least one pair of state-change counts and taking the health condition into account, a skew level of the wing slat.

12. The system of claim 11, wherein the at least one first electronic device comprises a first landing-gear-and-steering control unit (LGSCU) and a second LGSCU, and wherein obtaining the at least one pair of signals comprises obtaining first and second pairs of signals from the at least one pair of sensors.

13. The system of claim 12, wherein the at least one second electronic device comprises a first slat-flap electronic control unit (SFECU) and a second SFECU, wherein the first SFECU is communicatively coupled to the first LGSCU for receiving therefrom the first pair of signals, and wherein the second SFECU is communicatively coupled to the second LGSCU for receiving therefrom the second pair of signals.

14. The system of claim 13, wherein the first SFECU is communicatively coupled to the second LGSCU for receiving therefrom the second pair of signals, and wherein the second SFECU is communicatively coupled to the first LGSCU for receiving therefrom the first pair of signals.

15. The system of claim 11, wherein the at least one second electronic device is further coupled to the at least one first electronic device for determining at least one pair of distance measurements based on the at least one pair of state-change counts, wherein determining the skew level of the wing slat based on the at least one pair of state-change counts comprises determining the skew level of the wing slat based on the at least one pair of distance measurements.

16. The system of claim 11, wherein the at least one second electronic device is further configured for:

comparing the skew level to a first skew threshold; and when the skew level is beyond the first skew threshold, raising an alert associated with the first skew threshold.

17. The system of claim 11, wherein the at least one second electronic device is further configured for:

comparing the skew level to a first skew threshold; and when the skew level is beyond the first skew threshold, inhibiting movement of the wing slats.

18. The system of claim 11, further comprising at least one sensor and a plurality of actuating devices affixed to the aircraft, the plurality of actuating devices configured for inducing a change of state in the at least one sensor.

19. The system of claim 11, wherein the at least one first electronic device is configured for converting the at least one pair of signals to derive the state-change counts in a format readable by the at least one second electronic device, wherein the at least one second electronic device is communicatively coupled to the at least one first electronic device for receiving the at least one pair of state-change counts in the format readable by the at least one second electronic device.

20. The system of claim 11, further comprising at least one data module cabinet (DMC), wherein the at least one second electronic device being communicatively coupled to the at least one first electronic device comprises the at least one first electronic device and the at least one second electronic device being communicatively coupled via the at least one DMC.

* * * * *